United States Patent
Pu et al.

(10) Patent No.: US 9,715,010 B2
(45) Date of Patent: Jul. 25, 2017

(54) APPARATUS AND METHOD FOR DETECTION

(71) Applicant: HTC Corporation, Taoyuan, Taoyuan County (TW)

(72) Inventors: Ta-Chun Pu, Taoyuan (TW);
Chun-Yih Wu, Taoyuan (TW);
Yen-Liang Kuo, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 321 days.

(21) Appl. No.: 14/555,990

(22) Filed: Nov. 28, 2014

(65) Prior Publication Data
US 2016/0154097 A1    Jun. 2, 2016

(51) Int. Cl.
| | |
|---|---|
| *G01S 13/56* | (2006.01) |
| *G01S 13/04* | (2006.01) |
| *G01S 7/02* | (2006.01) |
| *G01S 7/03* | (2006.01) |
| *H01Q 1/36* | (2006.01) |
| *H01Q 9/04* | (2006.01) |

(52) U.S. Cl.
CPC ............. *G01S 13/04* (2013.01); *G01S 7/026* (2013.01); *G01S 7/03* (2013.01); *H01Q 1/36* (2013.01); *H01Q 9/0407* (2013.01)

(58) Field of Classification Search
CPC ...... G01S 13/885; G01S 13/04; G01S 13/003; G01S 7/026
USPC ............................................. 342/27, 59, 159
See application file for complete search history.

(56) References Cited

U.S. PATENT DOCUMENTS

| | | | | |
|---|---|---|---|---|
| 5,717,407 | A | * | 2/1998 | Hong ................... H01Q 25/001 343/700 MS |
| 7,528,781 | B2 | * | 5/2009 | Lin ....................... H01Q 9/0428 343/700 MS |
| 9,316,732 | B1 | * | 4/2016 | Mohamadi .............. G01S 7/411 |
| 2005/0062639 | A1 | * | 3/2005 | Biggs ........................ G01S 7/03 342/22 |
| 2008/0218424 | A1 | * | 9/2008 | Blanton ............... H01Q 21/245 343/756 |
| 2008/0238781 | A1 | | 10/2008 | Su et al. |
| 2010/0109962 | A1 | | 5/2010 | Huang et al. |
| 2011/0241924 | A1 | * | 10/2011 | Yamamoto ............. G01B 15/08 342/27 |

(Continued)

FOREIGN PATENT DOCUMENTS

| | | |
|---|---|---|
| CN | 101546864 A | 9/2009 |
| CN | 103118825 A | 5/2013 |

(Continued)

*Primary Examiner* — Marcus Windrich
(74) *Attorney, Agent, or Firm* — Birch, Stewart, Kolasch & Birch, LLP

(57) ABSTRACT

A detection device for detecting an OUD (Object Under Detection) includes a transceiver, a first antenna element, and a second antenna element. The transceiver has a transmitter port and a receiver port. The first antenna element is coupled to the transmitter port of the transceiver. The second antenna element is coupled to the receiver port of the transceiver. The transceiver transmits an electromagnetic signal through the first antenna element to the OUD, and then receives a reflective signal through the second antenna element from the OUD. The electromagnetic signal has a first polarization direction, and the reflective signal has a second polarization direction.

23 Claims, 6 Drawing Sheets

(56) References Cited

U.S. PATENT DOCUMENTS

| | | | |
|---|---|---|---|
| 2011/0312421 A1 | 12/2011 | Rofougaran et al. | |
| 2013/0063310 A1* | 3/2013 | Mak | H01Q 1/246 343/700 MS |
| 2014/0361952 A1* | 12/2014 | Dobric | H01Q 9/0428 343/893 |
| 2015/0196272 A1* | 7/2015 | Sankar | G01S 7/5202 600/443 |
| 2016/0178741 A1* | 6/2016 | Ludlow | G01S 7/003 342/28 |

FOREIGN PATENT DOCUMENTS

| | | |
|---|---|---|
| TW | 200840140 | 10/2008 |
| TW | 201019532 A1 | 5/2010 |
| TW | I324414 | 5/2010 |
| TW | 201439573 A | 10/2014 |

* cited by examiner

APPARATUS AND METHOD FOR DETECTION

BACKGROUND OF THE INVENTION

Field of the Invention

The subject application generally relates to a detection device, and more specifically, to a radar detection device.

Description of the Related Art

A conventional radar system can detect an OUD (Object Under Detection). However, if detection of more than two different regions on the OUD is required, the radar system must have multiple antennas and multiple transceivers inside, thereby resulting in a higher manufacturing cost. In addition, the multipath fading effect of electromagnetic waves also affects the accuracy of detection by the radar system for detection. As a result, there is a need for a novel detection device for overcoming the drawbacks of conventional radar systems.

BRIEF SUMMARY OF THE INVENTION

In a preferred embodiment, the subject application is directed to a detection device for detecting an OUD (Object Under Detection). The detection device includes a first transceiver, a first antenna, and a second antenna. The first transceiver has a first transmission port and a first reception port. The first antenna element is coupled to the first transmission port. The second antenna element is coupled to the first reception port. The first transceiver transmits a first electromagnetic signal through the first antenna element to the OUD, and then receives a first reflective signal through the second antenna element from the OUD. The first electromagnetic signal has a first polarization direction, and the first reflective signal has a second polarization direction.

In some embodiments, the first polarization direction is opposite to the second polarization direction. In some embodiments, the first polarization direction and the second polarization direction are opposite elliptically-polarized. In some embodiments, the first antenna element transmits the first electromagnetic signal to a first region on the OUD at a first incidence angle, and the second antenna element receives the first reflective signal from the first region on the OUD at a first reflection angle. In some embodiments, an axial ratio of the first electromagnetic signal significantly decreases as the first incidence angle increases, and significantly increases as the first incidence angle decreases, or the axial ratio of the first electromagnetic signal significantly increases as the first incidence angle increases, and significantly decreases as the first incidence angle decreases. In some embodiments, an axial ratio of the first reflective signal significantly increases as the first reflection angle increases, and significantly decreases as the first reflection angle decreases, or the axial ratio of the first reflective signal significantly decreases as the first reflection angle increases, and significantly increases as the first reflection angle decreases. In some embodiments, the detection device further includes a second transceiver. The second transceiver has a second transmission port and a second reception port. The first antenna element is further coupled to the second reception port, and the second antenna element is further coupled to the second transmission port. The second transceiver transmits a second electromagnetic signal through the second antenna element to the OUD, and then receives a second reflective signal through the first antenna element from the OUD. The second electromagnetic signal has a third polarization direction, and the second reflective signal has a fourth polarization direction. In some embodiments, the third polarization direction is opposite to the fourth polarization direction. In some embodiments, the third polarization direction and the fourth polarization direction are opposite elliptically-polarized. In some embodiments, the second antenna element transmits the second electromagnetic signal to a second region on the OUD at a second incidence angle, and the first antenna element receives the second reflective signal from the second region on the OUD at a second reflection angle. In some embodiments, an axial ratio of the second electromagnetic signal significantly decreases as the second incidence angle increases, and significantly increases as the second incidence angle decreases, or the axial ratio of the second electromagnetic signal significantly increases as the second incidence angle increases, and significantly decreases as the second incidence angle decreases. In some embodiments, an axial ratio of the second reflective signal significantly increases as the second reflection angle increases, and significantly decreases as the second reflection angle decreases, or the axial ratio of the second reflective signal significantly decreases as the second reflection angle increases, and significantly increases as the second reflection angle decreases. In some embodiments, the second region is different from the first region. In some embodiments, any of the first antenna element and the second antenna element includes a ground plane and a radiation metal piece. The radiation metal piece is substantially parallel to the ground plane, and coupled to the first transmission port or the first reception port. In some embodiments, the radiation metal piece substantially has a rectangular shape without two opposite corner portions. In some embodiments, the radiation metal piece substantially has a hexagonal shape. In some embodiments, the radiation metal piece further has two slots which are opposite and substantially parallel to each other, and two open ends of the slots are positioned at two opposite edges of the radiation metal piece, respectively. In some embodiments, each of the slots substantially has an L-shape. In some embodiments, the radiation metal piece further includes two protruded portions, and the protruded portions are coupled to two opposite corners of the radiation metal piece, respectively. In some embodiments, each of the protruded portions substantially has a straight-line shape. In some embodiments, any of the first antenna element and the second antenna element further includes a first extension element. The first extension element is substantially perpendicular to the ground plane and the radiation metal piece. The first transmission port or the first reception port is coupled through the first extension element to the radiation metal piece. In some embodiments, any of the first antenna element and the second antenna element further includes a second extension element. The second extension element is substantially perpendicular to the ground plane and the radiation metal piece. The first extension element and the second extension element are coupled to two opposite edges of the radiation metal piece, respectively.

In another preferred embodiment, the subject application is directed to a method for detection. The method includes the steps of: providing a first transceiver, a first antenna element, and a second antenna element, wherein the first antenna element is coupled to a first transmission port of the first transceiver, and the second antenna element is coupled to a first reception port of the first transceiver; using the first transceiver to transmit a first electromagnetic signal through the first antenna element to an OUD (Object Under Detection); and using the first transceiver to receive a first reflective signal through the second antenna element from the OUD. The first electromagnetic signal has a first polarization direction, and the first reflective signal has a second polarization direction.

BRIEF DESCRIPTION OF DRAWINGS

The subject application can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
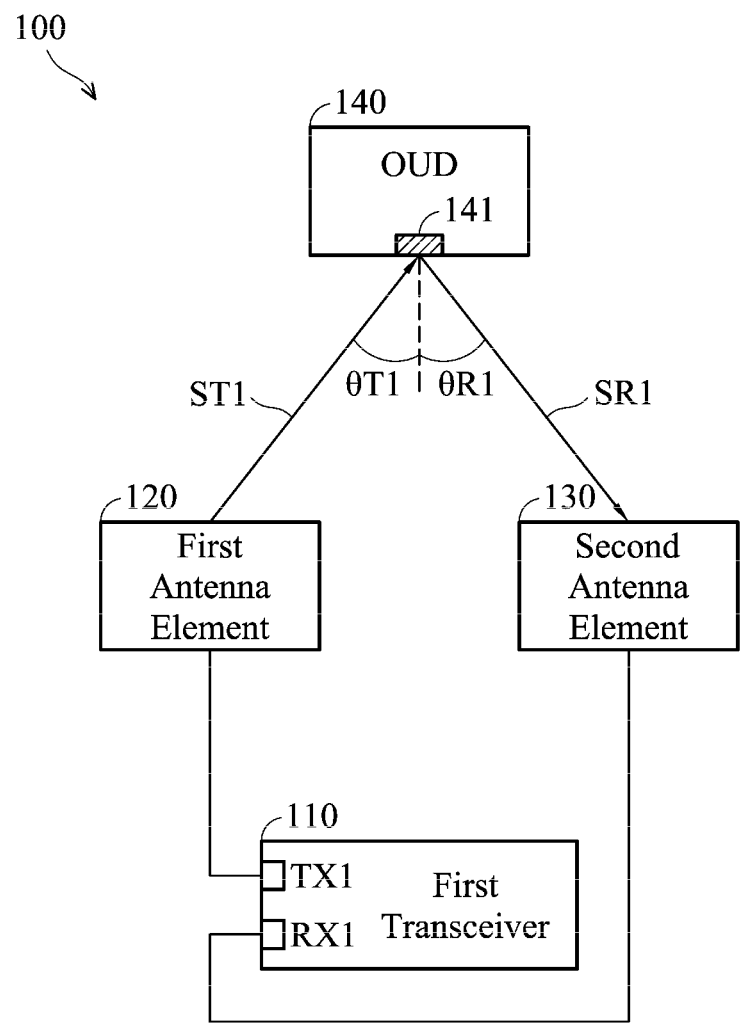
FIG. 1 is a diagram of a detection device according to an embodiment of the invention.

FIG. 1 is a diagram of a detection device 100 according to an embodiment of the invention. The detection device 100 may be suitable for application in the radar detection or medical field. For example, the detection device 100 can detect the position or a small movement of an OUD (Object Under Detection) 140. As shown in FIG. 1, the detection device 100 at least includes a first transceiver 110, a first antenna element 120, and a second antenna element 130. The first transceiver 110 has the functions of both transmission and reception. The first transceiver 110 has a first transmission port TX1 and a first reception port RX1. Each of the first antenna element 120 and the second antenna element 130 may be any type of antenna, such as a monopole antenna, a dipole antenna, a loop antenna, a circular polarization antenna, an elliptical polarization antenna, or a helical antenna. The first antenna element 120 is coupled to the first transmission port TX1 of the first transceiver 110. The second antenna element 130 is coupled to the first reception port RX1 of the first transceiver 110.

When the detection device 100 performs a detection procedure, the first transceiver 110 transmits a first electromagnetic signal ST1 through the first antenna element 120 to the OUD 140, and then the first transceiver 110 receives a first reflective signal SR1 through the second antenna element 130 from the OUD 140. The first electromagnetic signal ST1 has a first polarization direction, and the first reflective signal SR1 has a second polarization direction. The first polarization direction may be opposite to the second polarization direction. In some embodiments, the first polarization direction and the second polarization direction are opposite elliptically-polarized. For example, if the first polarization direction is left-hand elliptically-polarized, the second polarization direction should be right-hand elliptically-polarized, and if the first polarization direction is right-hand elliptically-polarized, the second polarization direction should be left-hand elliptically-polarized. More particularly, the first antenna element 120 transmits the first electromagnetic signal ST1 to a first region 141 on the OUD 140 at a first incidence angle $\theta T1$, and the second antenna element 130 receives the first reflective signal SR1 from the first region 141 on the OUD at a first reflection angle $\theta R1$. The first incidence angle $\theta T1$ and the first reflection angle $\theta R1$ are determined on the basis of the normal direction of the reflecting surface of the first region 141. According to the reflection law, the first reflection angle $\theta R1$ should be equal to the first incidence angle $\theta T1$.

Figure 2A:
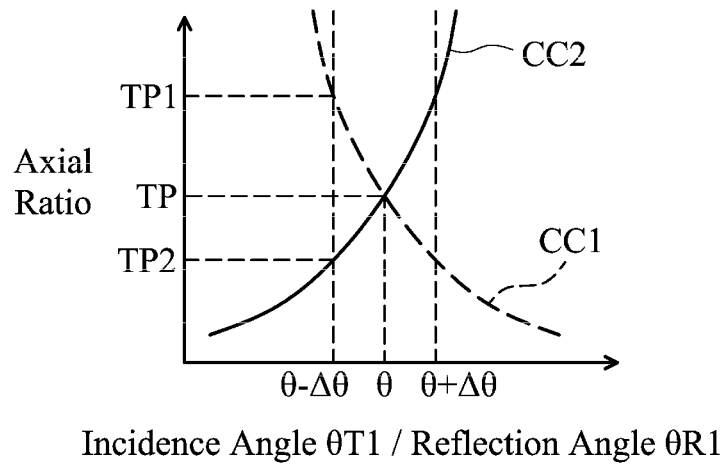
FIG. 2A is a diagram of the relationship between a first incidence angle or a first reflection angle and its corresponding signal axial ratio (AR) according to an embodiment of the invention.

FIG. 2A is a diagram of the relationship between the first incidence angle $\theta T1$ or the first reflection angle $\theta R1$ and its corresponding signal axial ratio (AR) according to an embodiment of the invention. In the embodiment of FIG. 2A, the first electromagnetic signal ST1 and the first reflective signal SR1 are opposite elliptically-polarized. A first curve CC1 represents the relationship between the first incidence angle $\theta T1$ and the axial ratio of the first electromagnetic signal ST1 transmitted by the first antenna element 120. A second curve CC2 represents the relationship between the first reflection angle $\theta R1$ and the axial ratio of the first reflective signal SR1 received by the second antenna element 130. If the first incidence angle $\theta T1$ and the first reflection angle $\theta R1$ are both equal to a preferred value $\theta$, the axial ratio of the first electromagnetic signal ST1 and the axial ratio of the first reflective signal SR1 can be both equal to a preferred axial ratio TP. Conversely, if the first incidence angle $\theta T1$ and the first reflection angle $\theta R1$ are away from the preferred value $\theta$, the axial ratio of the first electromagnetic signal ST1 transmitted by the first antenna element 120, and the axial ratio of the first reflective signal SR1 capable of being received by the second antenna element 130 would be both changed and significantly away from the preferred axial ratio TP.

In the embodiment of FIG. 2A, the axial ratio of the first electromagnetic signal ST1 significantly decreases as the first incidence angle $\theta T1$ increases, and significantly increases as the first incidence angle $\theta T1$ decreases; and the axial ratio of the first reflective signal SR1 significantly increases as the first reflection angle $\theta R1$ increases, and significantly decreases as the first reflection angle $\theta R1$ decreases. The characteristic of the aforementioned axial ratio can be achieved by appropriately designing the structures of the first antenna element 120 and the second antenna element 130. In alternatively embodiments, the axial ratio of the first electromagnetic signal ST1 significantly increases as the first incidence angle $\theta T1$ increases, and significantly decreases as the first incidence angle $\theta T1$ decreases; and the axial ratio of the first reflective signal SR1 significantly decreases as the first reflection angle $\theta R1$ increases, and significantly increases as the first reflection angle $\theta R1$ decreases (it can be considered as an exchange between the first curve CC1 and the second curve CC2). The axial ratio of the first electromagnetic signal ST1 is sensitive to the change of the first incidence angle $\theta T1$, and the axial ratio of the first reflective signal SR1 is sensitive to the change of the first reflection angle $\theta R1$. The above axial ratios have very steep slopes around the preferred value $\theta$ (e.g., the slope may be defined as $dAR/d\theta$). It is assumed that the first incidence angle $\theta T1$ and the first reflection angle $\theta R1$ are away from the preferred value $\theta$, and would be equal to a first bias value $\theta + \Delta\theta$ or a second bias value $\theta - \Delta\theta$. As shown in FIG. 2, on the basis of the second bias value $\theta - \Delta\theta$, the axial ratio of the first electromagnetic signal ST1 transmitted by the first antenna element 120 is TP1, but the axial ratio of the first reflective signal SR1 capable of being received by the second antenna element 130 is TP2 at this angle. Since the two axial ratios are significantly different, i.e., the axial ratio mismatch, the received signal strength of the detection device 100 may become weak.

Figure 2B:
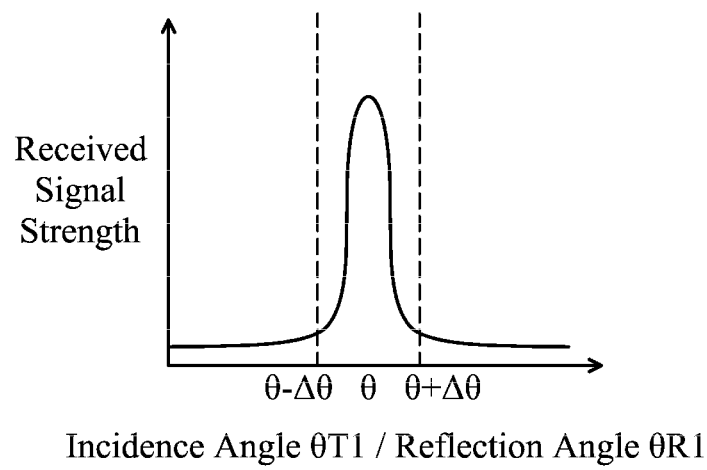
FIG. 2B is a diagram of the relationship between a first incidence angle or a first reflection angle and its corresponding received signal strength according to an embodiment of the invention.

FIG. 2B is a diagram of the relationship between the first incidence angle θT1 or the first reflection angle θR1 and its corresponding received signal strength according to an embodiment of the invention. As shown in FIG. 2B, if the first incidence angle θT1 and the first reflection angle θR1 are both equal to the preferred value θ, the axial ratios can be matched, and the detection device 100 can have the highest received signal strength (i.e., the strength of the first reflective signal SR1 received by the second antenna element 130 is the highest). Conversely, if the first incidence angle θT1 and the first reflection angle θR1 are away from the preferred value θ, and would be equal to the first bias value θ+Δθ or the second bias value θ-Δθ, the aforementioned received signal strength may be significantly reduced due to the mismatched axial ratios. With such a design, the first antenna element 120 and the second antenna element 130 have attenuated transmission and reception signals on the condition that the incidence angle or the reflection angle is different from the preferred value θ. As a result, the detection device 100 of the invention is capable of filtering and removing noise in the undesired directions. In a preferred embodiment, when the detection device 100 performs a detection procedure to the first region 141 on the OUD 140 (e.g., detecting its position or upward and downward movement), the first antenna element 120 transmits the first electromagnetic signal ST1 to the first region 141 at the first incidence angle θT1 which is equal to the preferred value θ, and the second antenna element 130 receives the first reflective signal SR1 from the first region 141 at the first reflection angle θR1 which is equal to the preferred value θ. Under the circumstance, due to the matched axial ratios, the detection device 100 can have the highest received signal strength. The other signals, caused by multipath fading (e.g., electromagnetic waves reflected by a wall), have the effective incidence angle and reflection angle which are not equal to the preferred value θ, and therefore they do not tend to be received by the second antenna element 130. In an ideal case, the detection device 100 can transmit and receive the signals in the direction of the first region 141, and its SNR (Signal-to-Noise Ratio) can be greatly increased, thereby significantly improving the quality of detection.

Figure 3:
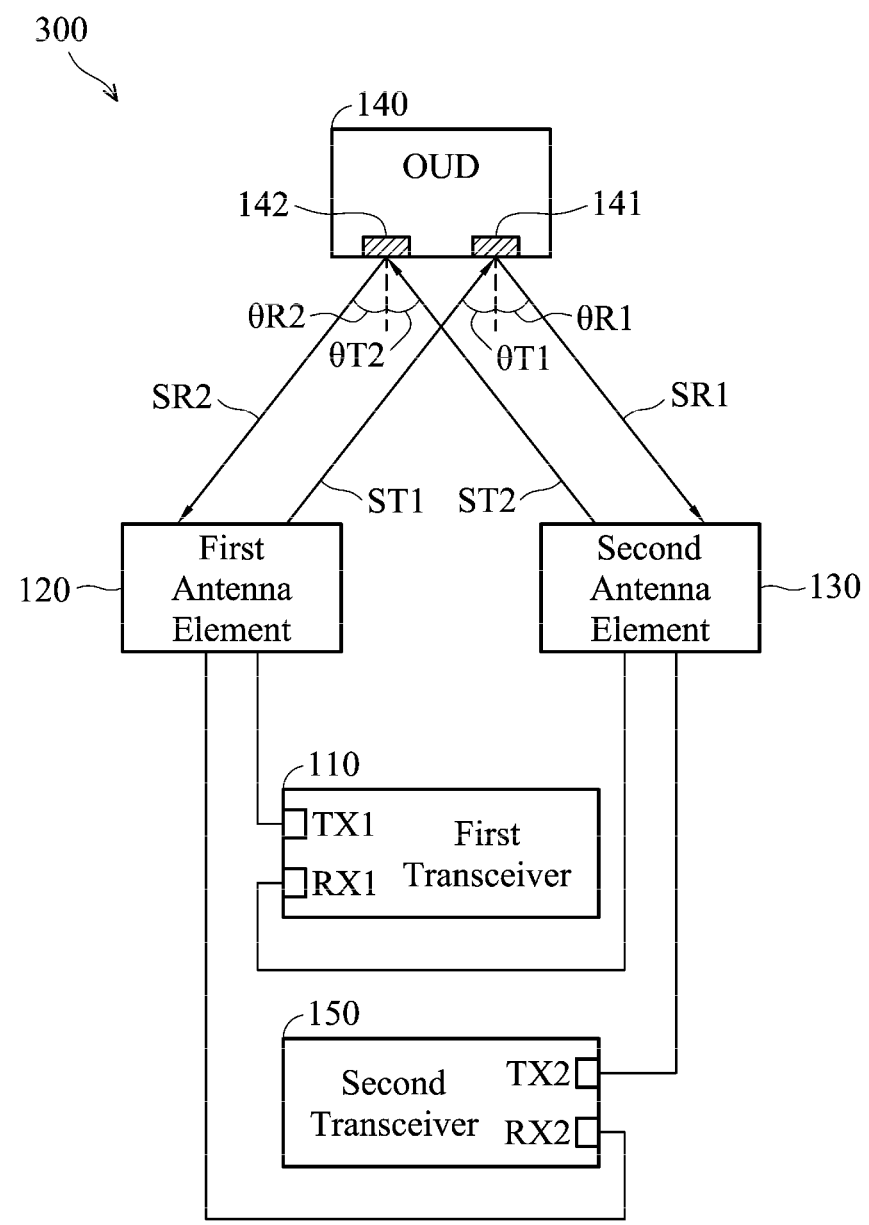
FIG. 3 is a diagram of a detection device according to an embodiment of the invention.

FIG. 3 is a diagram of a detection device 300 according to an embodiment of the invention. FIG. 3 is similar to FIG. 1. The difference between the two embodiments is that the detection device 300 further includes a second transceiver 150. The second transceiver 150 has a second transmission port TX2 and a second reception port RX2. The first antenna element 120 is further coupled to the second reception port RX2 of the second transceiver 150, and the second antenna 130 is further coupled to the second transmission port TX2 of the second transceiver 150. The second transceiver 150 transmits a second electromagnetic signal ST2 through the second antenna element 130 to the OUD 140, and then the second transceiver 150 receives a second reflective signal SR2 through the first antenna element 120 from the OUD 140. The second electromagnetic signal ST2 has a third polarization direction, and the second reflective signal SR2 has a fourth polarization direction. The third polarization direction is opposite to the fourth polarization direction. In some embodiments, the third polarization direction and the fourth polarization direction are opposite elliptically-polarized. On the other hand, the third polarization direction may be opposite to the second polarization direction, and the fourth polarization direction may be opposite to the first polarization direction. As a result, each antenna element does not transmit and receive signals in the same polarization direction concurrently, thereby increasing the antenna isolation. For example, the first antenna element 120 may transmit the first electromagnetic signal ST1 which is left-hand elliptically-polarized, and receive the second reflective signal SR2 which is right-hand elliptically-polarized; the second antenna element 130 may transmit the second electromagnetic signal ST2 which is left-hand elliptically-polarized, and receive the first reflective signal SR1 which is right-hand elliptically-polarized. The invention is not limited to the above. More particularly, the second antenna element 130 transmits the second electromagnetic signal ST2 to a second region 142 on the OUD 140 at a second incidence angle θT2, and the first antenna element 120 receives the second reflective signal SR2 from the second region 142 on the OUD at a second reflection angle θR2. The second incidence angle θT2 and the second reflection angle θR2 are determined on the basis of the normal direction of the reflecting surface of the second region 142. The second reflection angle θR2 should be equal to the second incidence angle θT2. According to measurement results, when the same antenna element is used as both a transmission antenna and a reception antenna, its transmission radiation pattern may be slightly different from its reception radiation pattern, and therefore, the aforementioned second region 142 may be different from the aforementioned first region 141. In other words, the detection device 100 of the invention merely uses two antenna elements for signal transmission and reception, but it can still perform radar detections to different regions on the OUD 140 concurrently. As a result, the invention significantly reduces the manufacturing cost of the conventional detection device for detecting multiple regions. It should be understood that the above relationship between the second incidence angle θT2, the second reflection angle θR2, the corresponding axial ratios, and the corresponding received signal strength may be the same as those described in the embodiments of FIGS. 2A and 2B, the only difference is that the first incidence angle θT1 and the first reflection angle θR1 of FIGS. 2A and 2B are replaced with the second incidence angle θT2 and the second reflection angle θR2, respectively. This theory will not be illustrated again here.

Figure 4A:
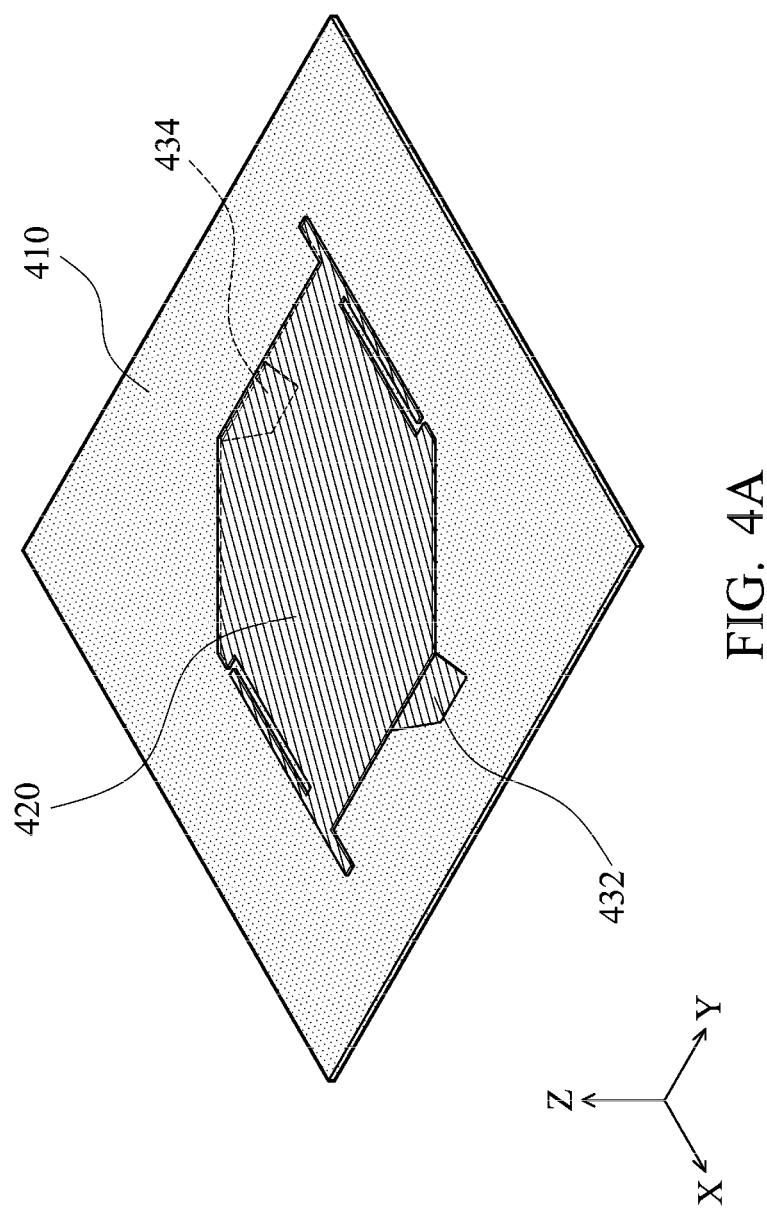
FIG. 4A is a perspective view of an antenna element according to an embodiment of the invention.
Figure 4B:
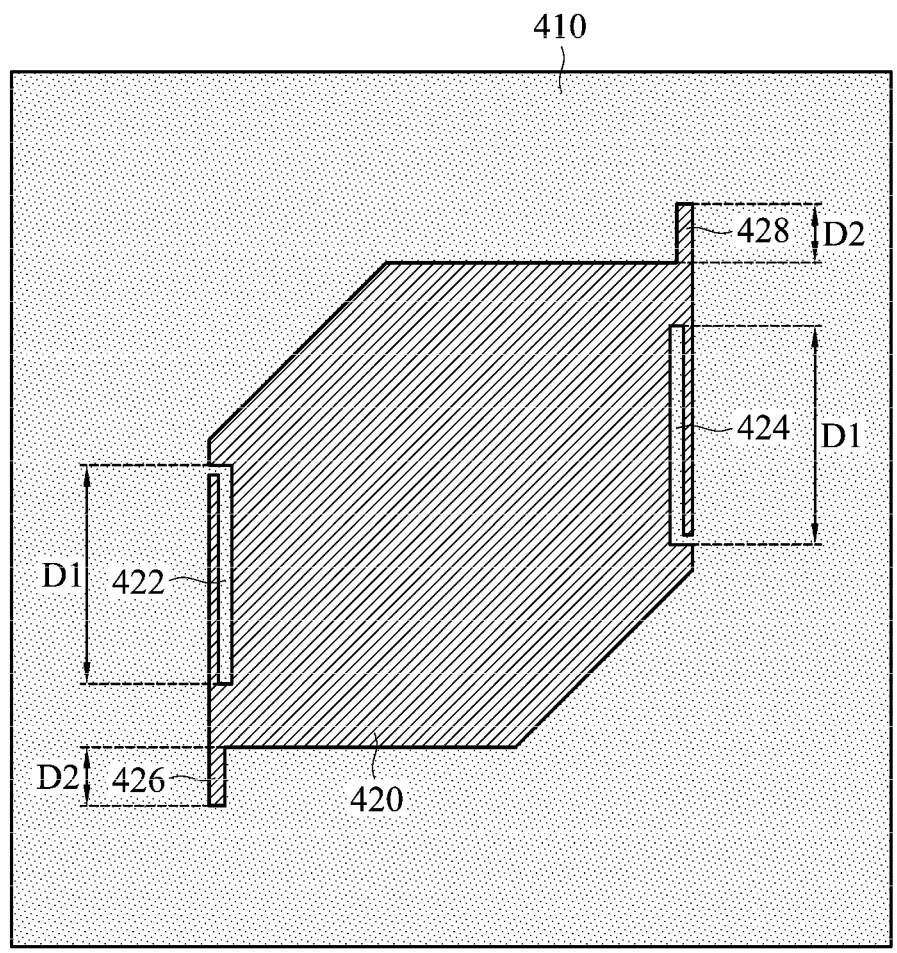
FIG. 4B is a top view of an antenna element according to an embodiment of the invention.

FIG. 4A is a perspective view of an antenna element 400 according to an embodiment of the invention. FIG. 4B is a top view of the antenna element 400 according to an embodiment of the invention. Please refer to FIGS. 4A and 4B. The antenna element 400 may be any one of the first antenna element 120 and the second antenna element 130. As shown in FIGS. 4A and 4B, the antenna element 400 at least includes a ground plane 410 and a radiation metal piece 420. The ground plane 410 and the radiation metal piece 420 may be made of conductive materials, such as copper, silver, iron, aluminum, or their alloys. The ground plane 410 may be disposed on a dielectric substrate, such as an FR4 (Flame Retardant 4) substrate or a system circuit board. The radiation metal piece 420 is substantially parallel to the ground plane 410. The radiation metal piece 420 is coupled to the first transmission port TX1 or the first reception port RX1 of the first transceiver 110, or coupled to the second transmission port TX2 or the second reception port RX2 of the second transceiver 150. The radiation metal piece 420 may substantially have a rectangular shape without two opposite corner portions, so as to transmit or receive circularlypolarized signals or elliptically-polarized signals. For example, the aforementioned corner portions may substantially have isosceles right triangular shapes, and they are removed such that the radiation metal piece 420 may substantially have a hexagonal shape. In some embodiments, the radiation metal piece 420 further has two slots 422 and 424 which are opposite and substantially parallel to each other, and two open ends of the slots 422 and 424 are positioned at two opposite edges of the radiation metal piece 420, respectively. Each of the slots 422 and 424 may substantially have an L-shape. The lengths D1 of the slots 422 and 424 may be shorter than 0.5 wavelength ($0.5\lambda$) of a central operating frequency of the antenna element 400. In some embodiments, the radiation metal piece 420 further includes two protruded portions 426 and 428, and the protruded portions 426 and 428 are coupled to two opposite corners of the radiation metal piece 420, respectively. The aforementioned two opposite corners are different from the other two corners at which some portions are removed. Each of the protruded portions 426 and 428 may substantially have a straight-line shape. The lengths D2 of the protruded portions 426 and 428 may be shorter than 0.25 wavelength ($0.25\lambda$) of the central operating frequency of the antenna element 400. In some embodiments, the antenna element 400 further includes a first extension element 432 and a second extension element 434. The first extension element 432 and the second extension element 434 are coupled to two opposite edges of the radiation metal piece 420, respectively. The first extension element 432 and the second extension element 434 are substantially perpendicular to the ground plane 410 and the radiation metal piece 420. Each of the first extension element 432 and the second extension element 434 may substantially have a tapered shape or a trapezoid shape. The first transmission port TX1 or the first reception port RX1 of the first transceiver 110, or the second transmission port TX2 or the second reception port RX2 of the second transceiver 150 may be coupled through the first extension element 432 or the second extension element 434 to the radiation metal piece 420. In some embodiments, the antenna element 400 may include only either the first extension element 432 or the second extension element 434, so as to form an asymmetrical structure and adjust the impedance matching. According to some measurements, the antenna element 400 may be used as a transmission antenna or a reception antenna. The antenna element 400 can provide the changing characteristics of axial ratio of FIGS. 2A and 2B, and have the functions of filtering and removing noise in undesired directions, increasing SNR, and enhancing the quality of detection. By flipping and mirroring the antenna element 400, or selecting appropriate feeding or receiving points, the antenna element 400 may be suitable for application in the detection devices 100 and 300 of the invention, and it can process elliptically polarized signals in a variety of directions.

Figure 5:
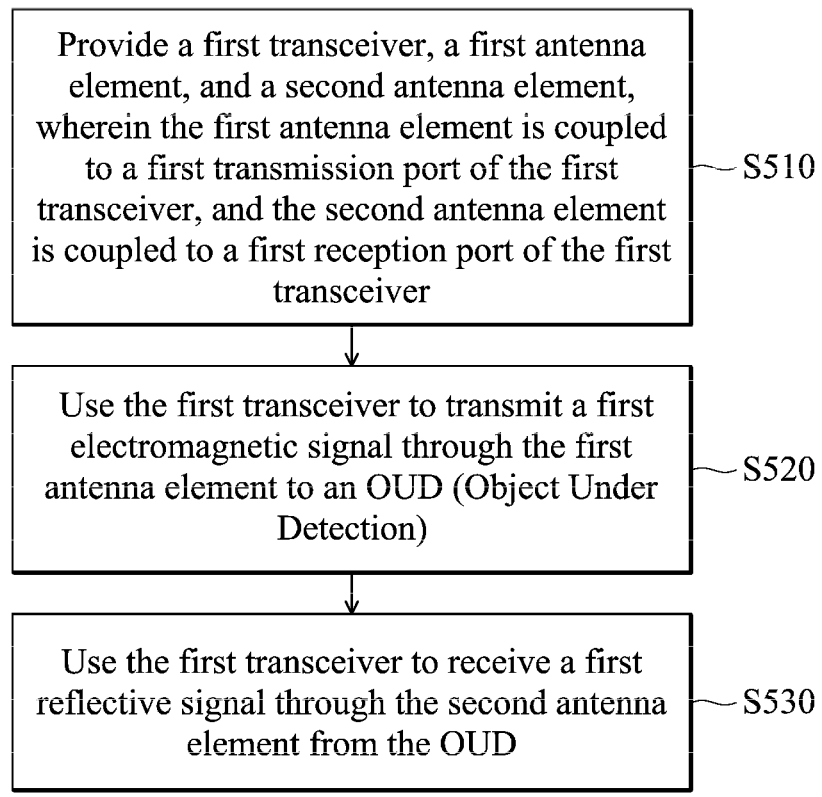
FIG. 5 is a flowchart of a method for detection according to an embodiment of the invention.

FIG. 5 is a flowchart of a method for detection according to an embodiment of the invention. The method includes the following steps. In the step S510, a first transceiver, a first antenna element, and a second antenna element are provided. The first antenna element is coupled to a first transmission port of the first transceiver, and the second antenna element is coupled to a first reception port of the first transceiver. In step S520, the first transceiver is used to transmit a first electromagnetic signal through the first antenna element to an OUD (Object Under Detection). In step S530, the first transceiver is used to receive a first reflective signal through the second antenna element from the OUD. The first electromagnetic signal has a first polarization direction, and the first reflective signal has a second polarization direction. The first polarization direction may be opposite to the second polarization direction. The first polarization direction and the second polarization direction may be opposite elliptically-polarized. It should be understood that any one or more features of the embodiments of FIGS. 1 to 4B may be applied to the detection method of the embodiment of FIG. 5.

The proposed detection device of the invention can make use of the matching or mismatching characteristics of antenna polarization directions, and focus radar detection on a specific region on the OUD, and suppress noise in the other undesired directions, so as to enhance the total detection quality. With two transceivers, the invention can use the original two antenna elements to detect different regions on the OUD, thereby reducing the total manufacturing cost. As to practical applications, for example, the proposed detection device of the invention can monitor, by the radar theory, an upward or downward movement of the chest (e.g., the first region) and the abdomen (e.g., the second region) of a patient who is breathing. The data obtained from the detection device may be analyzed further, and therefore the state of the patient's health may be determined. For example, the invention may be applied to sleep apnea patients, and their data and information about their breathing may be easily obtained by the invention during their sleep periods. The invention is useful in the medical field, and it is better than conventional designs with complicated and inconvenient equipment.

Note that the above element shapes and element parameters are not limitations of the invention. An antenna designer can fine-tune these settings or values according to different requirements. The detection device and detection method of the invention are not limited to the configurations of FIGS. 1 to 5. The invention may merely include any one or more features of any one or more embodiments of FIGS. 1 to 5. In other words, not all of the features displayed in the figures should be implemented in the detection device and detection method of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for the ordinal term) to distinguish the claim elements.

The embodiments of the disclosure are considered as exemplary only, not limitations. It will be apparent to those skilled in the art that various modifications and variations can be made in the invention, the true scope of the disclosed embodiments being indicated by the following claims and their equivalents.

What is claimed is:

1. A detection device for detecting an OUD (Object Under Detection), comprising:
   a first transceiver, having a first transmission port and a first reception port;
   a first antenna element, coupled to the first transmission port; and
   a second antenna element, coupled to the first reception port,
   wherein the first transceiver transmits a first electromagnetic signal through the first antenna element to the OUD, and then receives a first reflective signal through the second antenna element from the OUD, wherein the first electromagnetic signal has a first polarization direction, and the first reflective signal has a second polarization direction, and wherein any of the first antenna element and the second antenna element comprises:
  a ground plane; and
  a radiation metal piece, being substantially parallel to the ground plane, and coupled to the first transmission port or the first reception port,
    wherein the radiation metal piece further has two slots which are opposite and substantially parallel to each other, and two open ends of the slots are positioned at two opposite edges of the radiation metal piece, respectively.

2. The detection device as claimed in claim 1, wherein the first polarization direction is opposite to the second polarization direction.

3. The detection device as claimed in claim 2, wherein the first polarization direction and the second polarization direction are opposite elliptically-polarized.

4. The detection device as claimed in claim 3, wherein the first antenna element transmits the first electromagnetic signal to a first region on the OUD at a first incidence angle, and the second antenna element receives the first reflective signal from the first region on the OUD at a first reflection angle.

5. The detection device as claimed in claim 4, wherein an axial ratio of the first electromagnetic signal significantly decreases as the first incidence angle increases, and significantly increases as the first incidence angle decreases, or wherein the axial ratio of the first electromagnetic signal significantly increases as the first incidence angle increases, and significantly decreases as the first incidence angle decreases.

6. The detection device as claimed in claim 4, wherein an axial ratio of the first reflective signal significantly increases as the first reflection angle increases, and significantly decreases as the first reflection angle decreases, or wherein the axial ratio of the first reflective signal significantly decreases as the first reflection angle increases, and significantly increases as the first reflection angle decreases.

7. The detection device as claimed in claim 4, further comprising:
  a second transceiver, having a second transmission port and a second reception port, wherein the first antenna element is further coupled to the second reception port, and the second antenna element is further coupled to the second transmission port;
  wherein the second transceiver transmits a second electromagnetic signal through the second antenna element to the OUD, and then receives a second reflective signal through the first antenna element from the OUD;
  wherein the second electromagnetic signal has a third polarization direction, and the second reflective signal has a fourth polarization direction.

8. The detection device as claimed in claim 7, wherein the third polarization direction is opposite to the fourth polarization direction.

9. The detection device as claimed in claim 8, wherein the third polarization direction and the fourth polarization direction are opposite elliptically-polarized.

10. The detection device as claimed in claim 9, wherein the second antenna element transmits the second electromagnetic signal to a second region on the OUD at a second incidence angle, and the first antenna element receives the second reflective signal from the second region on the OUD at a second reflection angle.

11. The detection device as claimed in claim 10, wherein an axial ratio of the second electromagnetic signal significantly decreases as the second incidence angle increases, and significantly increases as the second incidence angle decreases, or wherein the axial ratio of the second electromagnetic signal significantly increases as the second incidence angle increases, and significantly decreases as the second incidence angle decreases.

12. The detection device as claimed in claim 10, wherein an axial ratio of the second reflective signal significantly increases as the second reflection angle increases, and significantly decreases as the second reflection angle decreases, or wherein the axial ratio of the second reflective signal significantly decreases as the second reflection angle increases, and significantly increases as the second reflection angle decreases.

13. The detection device as claimed in claim 10, wherein the second region is different from the first region.

14. The detection device as claimed in claim 1, wherein the radiation metal piece substantially has a rectangular shape without two opposite corner portions.

15. The detection device as claimed in claim 14, wherein the radiation metal piece substantially has a hexagonal shape.

16. The detection device as claimed in claim 1, wherein each of the slots substantially has an L-shape.

17. The detection device as claimed in claim 14, wherein the radiation metal piece further comprises two protruded portions, and the protruded portions are coupled to two opposite corners of the radiation metal piece, respectively.

18. The detection device as claimed in claim 17, wherein each of the protruded portions substantially has a straight-line shape.

19. The detection device as claimed in claim 1, wherein any of the first antenna element and the second antenna element further comprises:
  a first extension element, being substantially perpendicular to the ground plane and the radiation metal piece, wherein the first transmission port or the first reception port is coupled through the first extension element to the radiation metal piece.

20. The detection device as claimed in claim 19, wherein any of the first antenna element and the second antenna element further comprises:
  a second extension element, being substantially perpendicular to the ground plane and the radiation metal piece, wherein the first extension element and the second extension element are coupled to two opposite edges of the radiation metal piece, respectively.

21. A method for detection, comprising the steps of:
  providing a first transceiver, a first antenna element, and a second antenna element, wherein the first antenna element is coupled to a first transmission port of the first transceiver, and the second antenna element is coupled to a first reception port of the first transceiver;
  using the first transceiver to transmit a first electromagnetic signal through the first antenna element to an OUD (Object Under Detection); and
  using the first transceiver to receive a first reflective signal through the second antenna element from the OUD,
  wherein the first electromagnetic signal has a first polarization direction, and the first reflective signal has a second polarization direction,
  wherein any of the first antenna element and the second antenna element comprises a ground plane and a radiation metal piece, and wherein the radiation metal piece is substantially parallel to the ground plane and is coupled to the first transmission port or the first reception port, and wherein the radiation metal piece further has two slots which are opposite and substantially parallel to each other, and two open ends of the slots are positioned at two opposite edges of the radiation metal piece, respectively.

22. The method as claimed in claim 21, wherein the first polarization direction is opposite to the second polarization direction.

23. The method as claimed in claim 22, wherein the first polarization direction and the second polarization direction are opposite elliptically-polarized.

* * * * *